United States Patent
Brown et al.

[19]

[11] Patent Number: 5,978,769
[45] Date of Patent: Nov. 2, 1999

[54] SYSTEM AND METHOD FOR DETERMINING AND ANALYZING BUILDING OCCUPANCY

[75] Inventors: Randall E. Brown, Neshanic Station; Kathleen P. Marvel, Martinsville; Scott R. Spencer, Lebanon, all of N.J.

[73] Assignee: Chubb & Sons, Warren, N.J.

[21] Appl. No.: 09/060,100

[22] Filed: Apr. 14, 1998

[51] Int. Cl.[6] .............................. G06F 17/60; G06F 17/40
[52] U.S. Cl. ........................................ 705/4; 702/5
[58] Field of Search .................................. 705/1, 4, 6, 7, 705/10; 702/1, 5, 16, 3; 364/461

[56] References Cited

U.S. PATENT DOCUMENTS

| | | | |
|---|---|---|---|
| 5,414,462 | 5/1995 | Veatch ........................................ | 348/135 |
| 5,839,113 | 11/1998 | Federau et al. .............................. | 705/4 |
| 5,852,810 | 12/1998 | Sotiroff et al. ............................. | 705/27 |
| 5,855,005 | 12/1998 | Schuler et al. .............................. | 705/4 |

OTHER PUBLICATIONS

"Geocoding manages CAT exposurers," Philip D. Miller, National Underwriter, vol. 99, No. 1, p. 3, Jan. 1995.
"Group 1 Software Releases The Geographic Coding System," News Release, Greenbelt, MD, Sep. 25, 1992.
"MapAccess Development Tools," Etak Inc., Nov. 1989.

*Primary Examiner*—Allen R. MacDonald
*Assistant Examiner*—John Campa
*Attorney, Agent, or Firm*—Gibbons, Del Deo, Dolan, Griffinger & Vecchione

[57] ABSTRACT

A system and method that determines building occupancy at a selected site by using geographically based structures to identify potential clients and to analyze aggregate carrier exposure levels at the selected site. This is achieved by using geographically based structures that are formed by geocoding business addresses and by linking all similarly geocoded businesses. Geographically based structures identify building characteristics and occupant related information. Specifically, all business addresses are address standardized, interjected with public protection code information and then geocoded. The geocoding information is used to identify and determine the building's occupancy configuration. For each tenant or occupant of the building, the system will initially display basic information that includes for example, business name, address and whether the business is currently insured by the carrier. The user can request additional information such as hazard concerns, safety issues and other occupant related information.

35 Claims, 7 Drawing Sheets

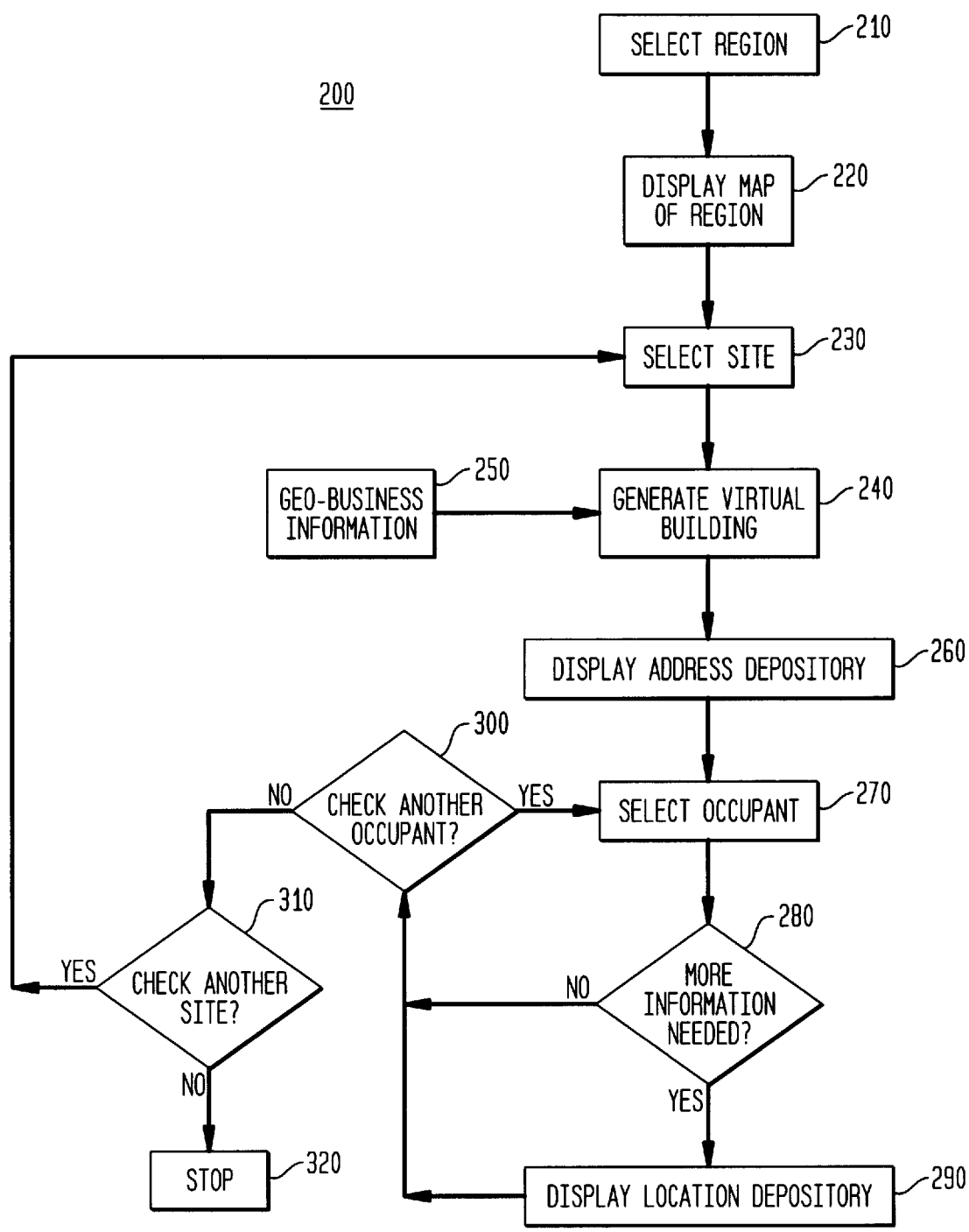

| | |
|---|---|
| 352 | POTENTIAL CLIENT |
| 354 | CHEMICAL COMPANY |
| 356 | DAY CARE |
| 358 | CONVENIENCE STORE |
| 360 | GARAGE |
| 362 | NEWSTAND |
| 364 | BANK |

350

SYSTEM AND METHOD FOR DETERMINING AND ANALYZING BUILDING OCCUPANCY

FIELD OF THE INVENTION

This invention relates to a system and method for determining building occupancy at a selected site, and in particular, using geographically based structures to identify potential clients, perform carrier exposure aggregation and perform risk analysis associated with operations performed by other occupants.

BACKGROUND OF THE INVENTION

In the insurance industry, underwriters determine carrier exposure levels and insurance cost estimates based on where clients are located and their surrounding environment. It is particularly important to determine if a building occupied by a potential client has other tenants and if so, the underwriter must ascertain the business activities of these tenants to address potential liability ro exposure. Typically, an agent of the underwriter visually inspects each particular site to obtain the necessary information. A drawback of this method is that it is very inefficient and time consuming. Further disadvantages of this approach are that the information obtained may be inaccurate and incomplete.

Mapping applications provide the underwriters an alternative means for obtaining some of the information. However, mapping applications have a number of drawbacks. Mapping applications are typically used for geographically locating and identifying specified places or areas. However, the usefulness of these mapping applications is limited by their inability to easily identify all of the businesses located at a particular common site. A different business may be located depending upon the mapping application used for the query. A potentially insurable client, therefore, may have different identified tenants as a result of using different mapping applications. Inconsistent results affect risk exposure, insurance coverage and insurance premium costs for the client. Moreover, the fact that different occupants of the same building may utilize different addresses adds to this inconsistency.

In addition to being inefficient, inaccurate and inconsistent, a further drawback of the prior art methods is an inability to easily provide updated information reflecting changes in the occupancy of the building. For example, a chemical research company may initially have been a tenant in a potential client's building. Some time later, a convenience store may have replaced the chemical research company. The difference between the two businesses in terms of, for example, hazardous wastes and fire potential, greatly affects the insurance carrier's exposure level and in turn, the client's insurance premiums. Accurate and updated information would require the underwriter to inspect the site on a regular basis. The timeliness of the inspections would unduly affect the carrier's exposure and the client's costs. Accordingly, there is a need to provide a system and method that consistently provides accurate and updated building occupancy information for a selected site.

SUMMARY OF THE INVENTION

The present invention is a system and method that determine building occupancy at a selected site by using geographically based structures to identify potential clients and to analyze aggregate carrier exposure levels at the selected site. Geographically based structures are formed by geocoding business addresses and by linking all similarly geocoded businesses. As such, geographically based structures are virtual buildings that have all of the building occupants identified. Importantly, the geographically based structure identifies building characteristics, such as construction type, and occupant related information, such as business type and carrier information, in response to the selection of a site using for example, a mapping application.

In an exemplary embodiment of the present method, a system determines building occupancy for a site selected on a display unit. The system generates and stores geo-business information by geocoding business information and moreover, by establishing the occupancy type of the building. The system geographically constructs a structure based on the coordinates of the selected site and the geo-business information by linking similarly geocoded businesses. Initial business data is displayed for each geo-matched business.

Advantageously, the system and method of the present invention permit the underwriter to identify insureds and non-insureds. The underwriter can then determine the overall exposure level of the carrier in the specified building, whether other tenants can be insured and whether the carrier should purchase reinsurance. This also allows underwriters to identify insureds existing within a catastrophe zone and to respond quickly when necessary. The present invention provides prospecting capabilities by identifying occupants that ire not insured by the user. Moreover, underwriters can review updated building occupancy information in a quick and efficient manner. As such, the above factors make the present invention an efficient and accurate means for classifying the insurance environment and determining the risk exposure for a selected site.

BRIEF DESCRIPTION OF THE DRAWINGS

A more complete understanding of the present invention may be obtained from consideration of the following description in conjunction with the drawings in which:

FIG. 2 is a functional flowchart of the building occupancy analysis in accordance with the method of the present invention;

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 1 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

The present invention is a system and method that determines building occupancy at a selected site by using geographically based structures to identify potential clients and to analyze aggregate carrier exposure levels at the selected site. The system and method allow the user, for example an underwriter, to select the potential client's location on a mapping application and review every tenant located at that building. This is achieved by using geographically based structures that are formed by geocoding business addresses and by linking all similarly geocoded businesses. Geographically based structures identify building characteristics and occupant related information. As such, the underwriter can immediately determine the carrier's exposure level and classify the insurance environment to determine the client's potential coverage and costs.

In general, a user will select a site via a mapping application. A virtual building is geographically constructed by including all of the tenants located at the selected location. As detailed below, all available business addresses are address standardized, interjected with public protection code information and then geocoded. The geocoding information is then used to identify, and determine the building's occupancy configuration. For each tenant or occupant of the building, the system will initially display basic information that includes, for example, business name, address and whether the business is currently insured by the carrier. The user can request additional information such as hazard concerns, safety issues and other occupant related information. The user can provide the potential client with a relatively instant and accurate estimation of insurance coverage and costs. Moreover, the occupancy configuration can identify vacant or empty buildings.

Figure 1:
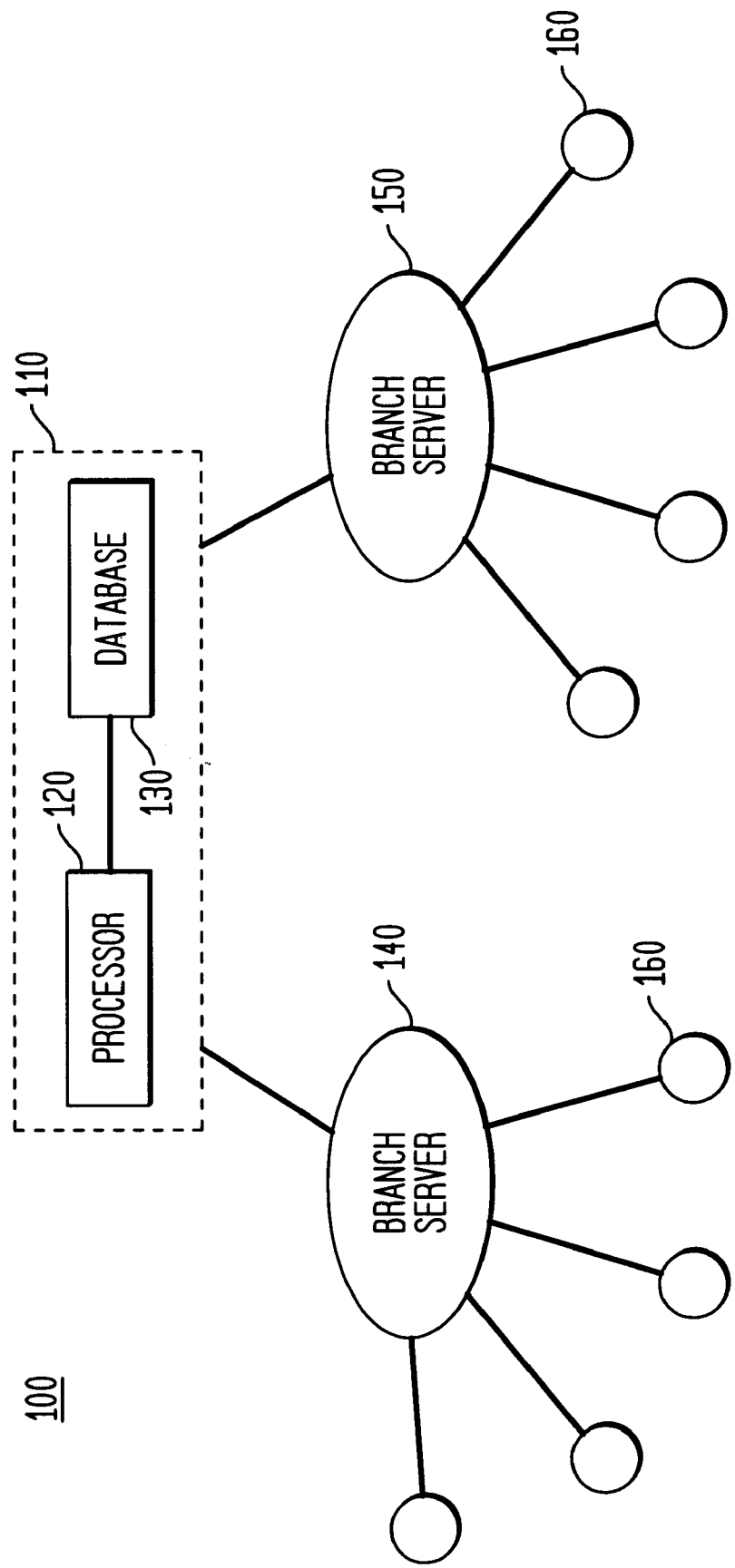
FIG. 1 is an exemplary embodiment of a system in accordance with the present invention.

FIG. 1 illustrates an exemplary embodiment of a system 100 which utilizes the present invention. System 100 consists of a computing device 110 that performs the majority of the functionality described herein. Computing device 110 includes a processor 120 that implements the present invention functionality and a database 130 that contains the geo-business information that is used to construct the virtual building. Computing device 110 is coupled to branch servers 140 and 150, which in turn are coupled to user terminals 160. System 100 is configured in an exemplary network configuration. Other multiple access network configurations can be implemented with respect to the present invention.

Referring now to FIG. 2, an exemplary functional flowchart 200 is presented of a building exposure or prospecting determination using the building occupancy analysis method of the present invention. The method is employable in system 100 of FIG. 1 and is illustrated with reference to display 300 of FIG. 3(a) and display 350 of FIG. 3(b). It is noted that all sites are nominally labeled using a coordinate system, e.g., a latitude and longitude value. As shown below, the coordinates are strategically used to link businesses together that contain information corresponding to a selected site. The information could include, for example, business data, address, hazards, distance from fire houses, and insurance carrier information.

Figures 3A, 3B:
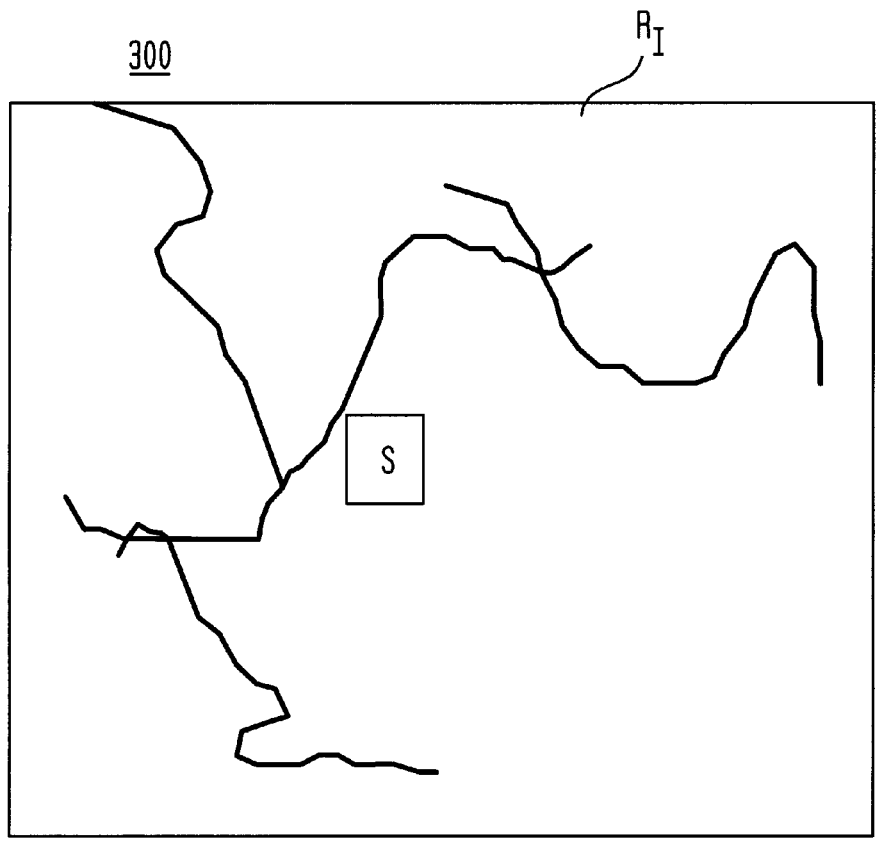
FIG. 3(a) and 3(b) illustrate visually the building occupancy analysis in accordance with the method of the present invention.

Referring to FIG. 2, FIG. 3(a), and FIG. 3(b), a user, such as an underwriter, will designate a region of interest ("$R_I$") (step 210). The system will call up and render the map containing the requested region $R_I$ (step 220). The underwriter will then select the specific site ("S") or location to be evaluated (step 230). Given the site location, a virtual building or geographically based construct is generated on-the-fly (step 240) by using the previously constructed geo-business information (step 250). For sake of clarity, the method used to generate the geo-business information is detailed below with reference to FIGS. 4–7.

The system of the present invention presents the geo-business information in two stages to prevent unnecessary traffic and congestion on the network. The system will display all the occupants located at S as shown in FIG. 3(b). The system initially displays information stored in an address depository (step 260) as a result of the query. This information is presented in a scrollable or selectable tabular format and includes, for example, business name, street address, city, state, ZIP+4, coordinate information, and a carrier insured indicator (step 270). Based on this data, the underwriter can request further information on any of the occupants 352–364 (step 280). In addition, the system will display occupancy/tenant structure in the building, public protection/safety information and hazard indicator data.

If more information is required, the system will display information stored in a location depository (step 290) as a result of the query. This information is also presented in a scrollable or selectable tabular format and includes in addition to the address depository information, such items as construction data, year built, building identifier, business name, business standard industry code, sales, headquarters, business branches, subsidiary locations, number of employees, catastrophe zone and year started. If no further information is required, then the underwriter can select or scroll to view another occupant (step 300). If the underwriter is finished with the selected site, either a new site is selected and the above process repeated (step 310) or the system is exited (step 320).

Figure 4:
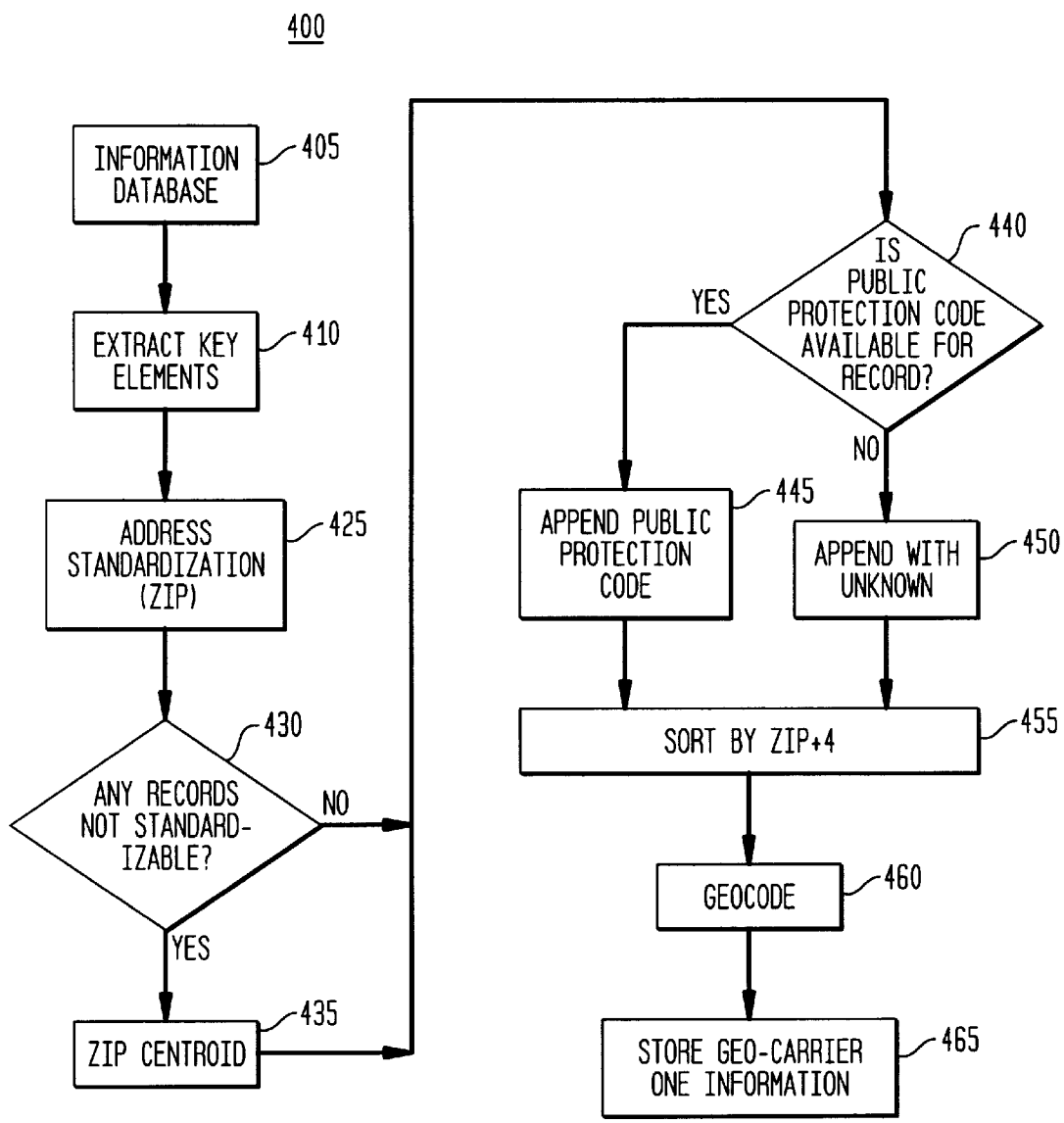
FIG. 4 is a functional flowchart of how one type of geo-carrier information is created in accordance with the method of the present invention.

Referring now to FIG. 4, a functional flowchart 400 describes how geo-business information is created using the building occupancy method of the present invention. As stated earlier, the virtual buildings or geographically based structures are generated on-the-fly by linking all similarly geo-coded businesses and displaying the result to the underwriter. Each geographically based structure defines all of the occupants residing at the selected site.

The building occupancy analysis of the present invention processes three sets of business information and a United States Postal Service ("USPS") ZIP+4 data set to create the geo-business information that is eventually used to construct the virtual building. The first two sets of business data relate to clients already insured by the underwriter's carrier. The third set of business data represents all businesses including a carrier's insureds. The USPS ZIP+4 data set is crucial for establishing addresses where the potential of multiple tenants exist at a single structure. Although the exemplary embodiment is discussed with reference to the above noted data sets, the number and type of data sets used is merely illustrative and the present invention may be implemented with any number and type of data sets.

The first business data set represents carrier policy information that contains references to Construction, Occupancy, Protection and Exposure ("COPE") information (step 405). COPE data contains information related to safety issues and environmental factors. The system initially extracts key data elements, for example, policy number, insured name, address, c ity, state and ZIP code, location number, building number, Building Coverage as an indicator and Sprinkler Coverage as an indicator (step 410). A unique identifier will be attached to all records that contain all of the extracted data elements. Each of the uniquely identified records is then sent through an address standardization process (step 425). This process appends ZIP+4 postal codes, city codes and country codes. The system determines if any records cannot be appended with the above information (step 430) and if any such records exist, they are placed in the geographic center of the ZIP code area represented by the ZIP code of the non-conforming records (step 435).

For the first data set, the system will determine if public protection code information is available by matching the city and ZIP codes (step 440). Public protection codes define how far a building is located from, for example, a fire station, police station or other such institutions. The higher a public protection code, the farther the distance and the costlier the insurance premiums. If a public protection is found, this is appended to the records surviving the core processing (step 445). For those records where a public protection code is not found, an "unknown" indicator is appended to the record (step 450). In an exemplary embodiment of the present invention method, the above data is then sorted by ZIP+4 to optimize the performance of subsequent processing (step 455). The sorted data is then geocoded by appending, for example, latitude and longitude (step 460). This data is stored as geo-carrier one information and is later geo-matched against the geo-information that results from the third data set.

Figure 5:
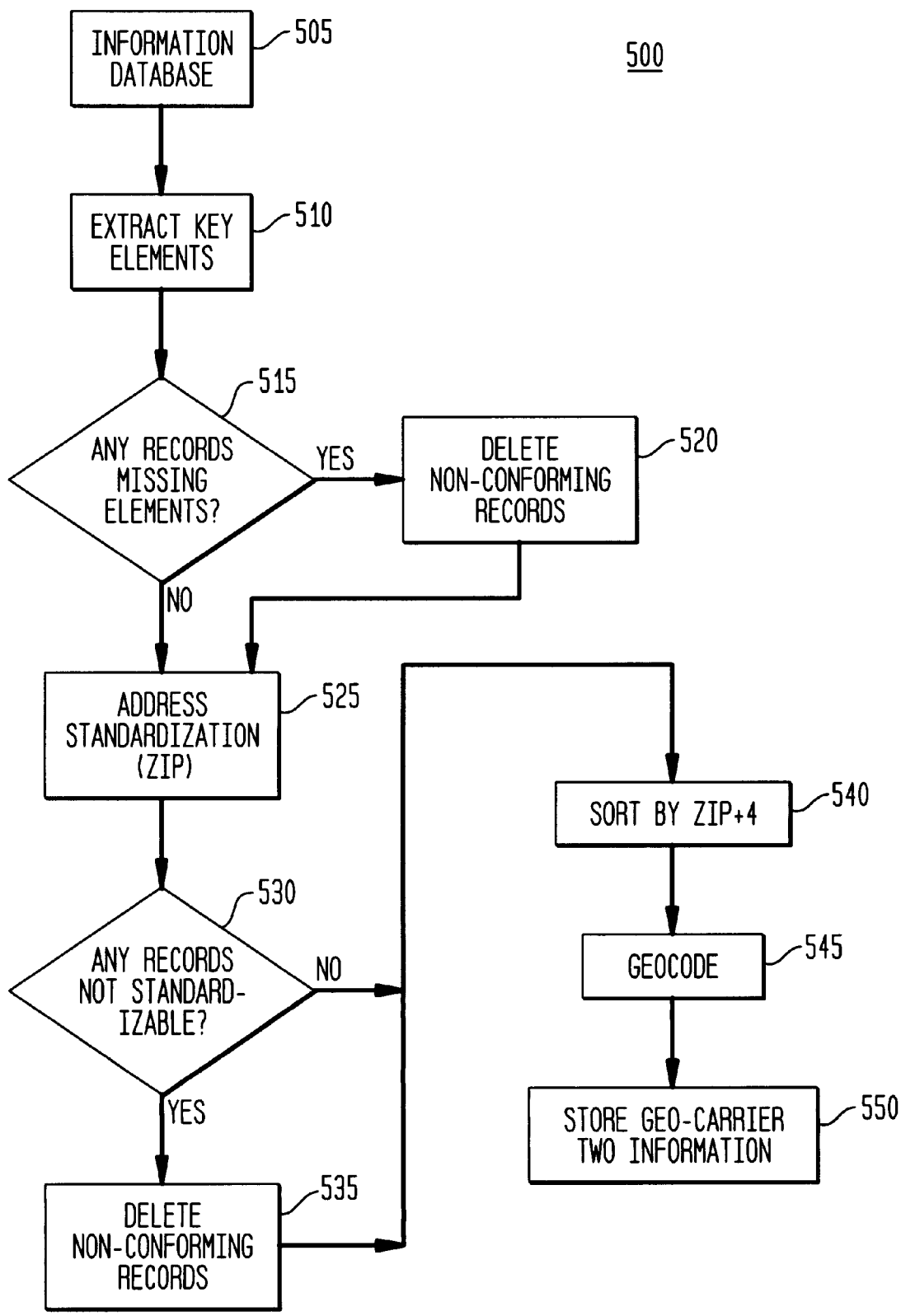
FIG. 5 is a functional flowchart of how a second type of geo-carrier information is created in accordance with the method of the present invention.

Referring now to FIG. 5, a functional flowchart 500 describes how a second carrier based business data set containing references to address information is processed (step 505). The system initially extracts key data elements, for example, policy number, insured name, address, city, state, ZIP code, location number and building number (step 510). A unique identifier will be attached to all records that survive data extraction (steps 510–520) and each surviving record is then sent through the address standardization process (steps 525–535). The surviving data is sorted by ZIP+4 (step 540) and geocoded by appending, for example, latitude and longitude data (step 545). This data is then stored as geo-carrier two information (step 550) and is later geo-matched against the geo-information that results from the third data set.

Figure 6:
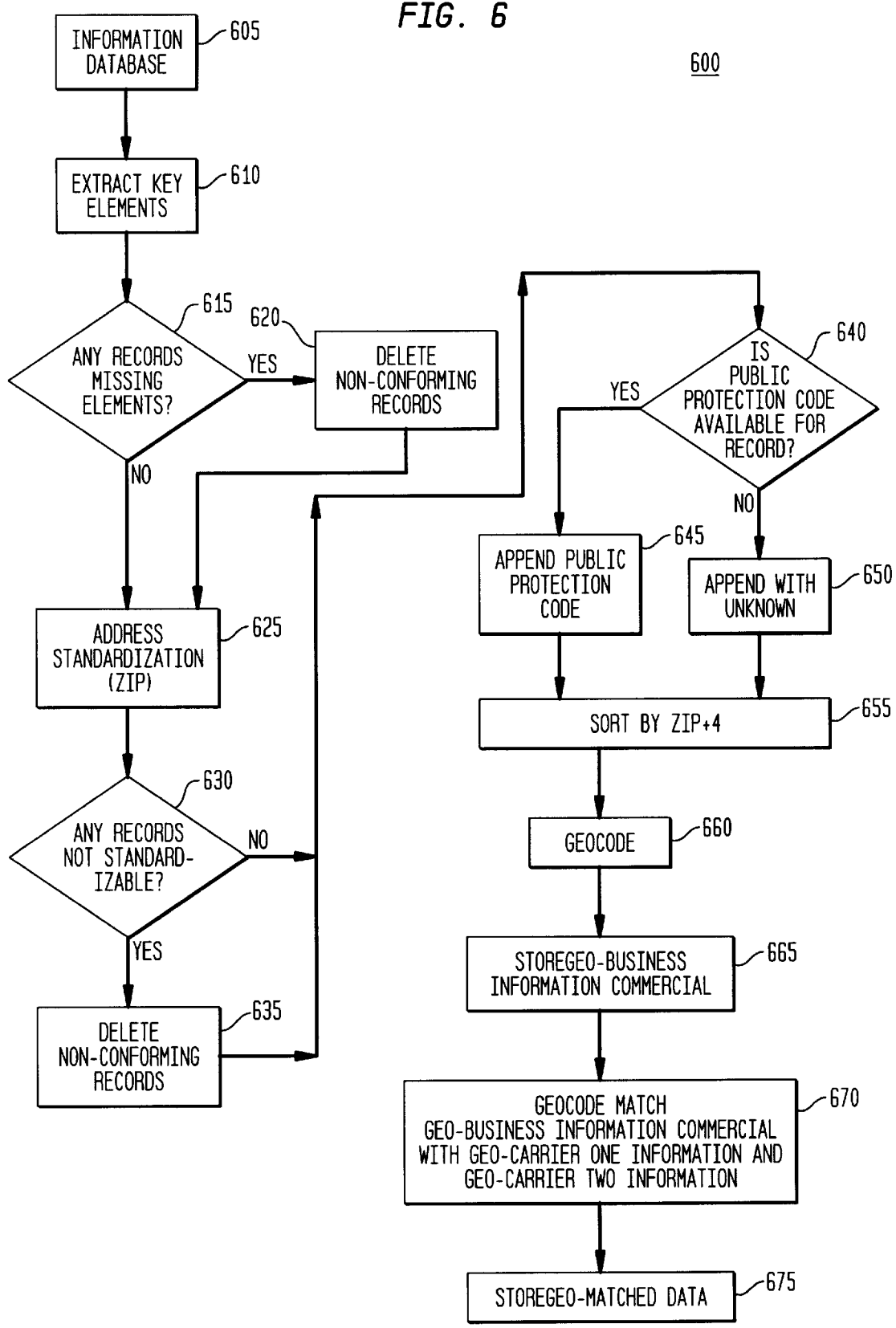
FIG. 6 is a functional flowchart of how geo-business information, commercial type is created in accordance with the method of the present invention.

Referring now to FIG. 6, a functional flowchart 600 describes how a commercial business data set is used to provide the base addresses that determine the geographical based structures of the present invention (step 605). The system initially extracts key data elements, for example, record row identification number, name, address, city, state, and ZIP code (step 610). A unique identifier will be attached to all records that survive the data extraction (steps 610–620) and each surviving record is then sent through the address standardization process (steps 625–635). The system sends this data through the public protection code processing (steps 640–650), as described above. The surviving data is sorted by ZIP+4 (step 655) and geocoded by appending, for example, latitude and longitude data (step 660). This data is then stored as geo-business information, commercial type (step 665). As mentioned above, the geo-business information, commercial type data set is geo-matched with the geo-carrier one information and geo-carrier two information (step 6 70) and stored as geo-carrier information (step 675).

Figure 7:
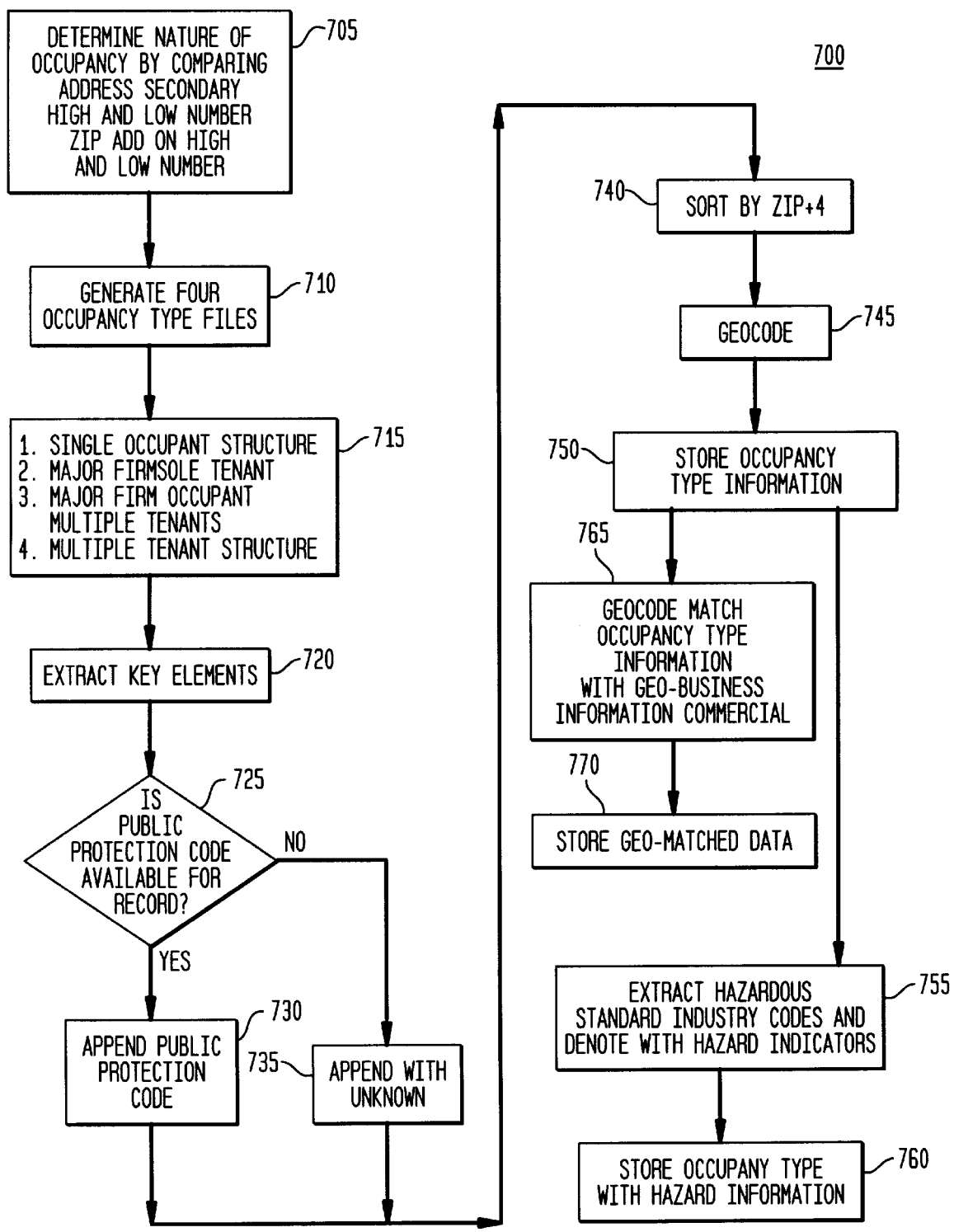
FIG. 7 is a functional flowchart of how occupancy is determined in accordance with the method of the present invention.

Referring now to FIG. 7, a functional flowchart 700 describes how the USPS ZIP+4 data set is used in accordance with the building occupancy method of the present invention. As stated above, the USPS ZIP+4 data set is crucial for establishing addresses where the potential of multiple tenants exist at a single structure. It is also crucial for establishing those structure addresses where only a single tenant occupies the structure or where there is a major firm as the sole occupant of the structure. The data set further, via the present invention method, identifies those structures where a major firm occupies the structure along with other tenants.

This is achieved by comparing the values of four types of data available in the USPS file: Address Secondary High Number ("AddHigh"), Address Secondary Low Number ("AddLow"), ZIP Add On High Number ("ZIPHigh"), and ZIP Add On Low Number ("ZIPLow") (step 705). The AddHigh and AddLow data types describe for example, if a structure is an apartment, room, suit, space, floor or other secondary addressing numeric or alphanumeric that follows a street address. In other words, it indicates an address where there are multiple deliverables for a single address. The ZIPHigh and ZIPLow data types describe the last four positions of a ZIP+4 code. Most delivery addresses are a single ZIP+4 code. However, large companies may be given a range of ZIP+4 codes that can be used to route mail to specific departments. In other words, it is evidence that a major firm is the only occupant of a structure or that the structure contains a major company tenant along with other tenants.

Occupancy types are determined by comparing the values present for each of the above described data types (step 710). If the range of AddHigh and AddLow values are exactly equal to the ZIPHigh and ZIPLow values, the structure is occupied by a major firm who is the sole occupant of the structure. The data set indicator is then set as Major Firm Sole Tenant. If the range of AddHigh and AddLow are greater than the range of ZIPHigh and ZIPLow values, the structure is occupied by multiple tenants of which at least one of the tenants is a major firm. This assumes that the ZIPHigh and ZIPLow data types are populated with numbers. In this case, the data set indicator is set as Major Firm Occupant—Multiple Tenants.

If there exists a range between the AddHigh and AddLow values and the ZIPHigh and ZIPLow data types are not populated, then the structure contains multiple tenants with no major firm occupant. In this case, the data set indicator is set as Multiple Tenant Structure. The potential number of tenants can be extracted from the AddHigh and AddLow range of values. Finally, if the AddHigh and AddLow range of values are equal to each other, then the structure is occupied by a single tenant and is identified as such. This also assumes that the ZIPHigh and ZIPLow data types are not populated.

Specifically, the Major Firm Sole Tenant type is determined by checking that the AddHigh and AddLow values are equal and that there are no other AddHigh and AddLow range of values for the address identified with the selected site. The method further verifies that the ZIPHigh and ZIPLow data types are populated. The Major Firm Occupant Multiple Tenants type checks that the AddHigh and AddLow values are not equal and that there are other AddHigh and AddLow range of values for the selected site. The method further verifies that the ZIPHigh and ZIPLow data types are populated. The Multiple Tenant Structure type checks that the AddHigh and AddLow data types are not equal and that ZIPHigh and ZIPLow data types are populated. Finally, the Single Occupant Structure type is determined by checking that the AddHigh and AddLow values are equal and that the ZIPHigh and ZIPLow fields are not populated. The USPS file is then processed in accordance with the above rules and the addresses meeting the four different occupancy types are extracted and appended with an occupancy type indicator (step 715).

The system then sends the occupancy type indicated files through the key data element extraction process. In this case, the extracted data includes, for example, ZIP code, record type, street pre-direction, street name, street suffix, street post-direction, Address Primary High and Low numbers, building or firm name, Address Secondary abbreviations (e.g., APT, BLDD, FIL, etc.), AddHigh and AddLow values, ZIPHigh and ZIPLow values, Finance number, state abbreviation and county number (step 720). The system then sends this data through the public protection code processing (steps 725–735). The surviving data is sorted by ZIP+4 (step 740) and geocoded by appending, for example, latitude and longitude data (step 745). This data is then stored as geo-occupancy type information (step 750). The geo-occupancy type information and the geo-business information commercial are geo-matched and stored with the uniquely identified occupant indicators as geo-business information (steps 765–770).

The geo-occupancy type information and the geo-business information, commercial type is further sent through hazard processing to identify hazardous business types to the business community (step 755). This is achieved by identifying hazardous standard industry codes and by employing geo-matching between the geo-occupancy type information and the geo-business information commercial. The resultant data set is stored and has hazard indicators attached to each identified record (step 760).

A system and method for determining building occupancy at a selected site by using geographically based structures to identify potential clients and to analyze aggregate carrier exposure levels at the selected site is presented herein. The system initially creates and stores geo-business information that includes occupancy configurations within a selected locale. The underwriter initially selects the region of interest and the system calls up and displays the pertinent map. After the underwriter has input the required site type, the system on-the-fly creates a geographically based structure that identifies all possible occupants at that site. The building characteristics, business characteristics, carrier insureds and non-carrier insureds are immediately displayed to the underwriter. The underwriter can then immediately determine the carrier's exposure level and classify the insurance environment to determine the client's potential coverage and costs.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A system for determining building occupancy for a site selected on a display unit, the system comprising:

means for creating geo-business information by geocoding business information;

means for geographically constructing a structure based on coordinates of the site and said geo-business information by geo-matching similarly geocoded businesses; and means for outputting business data on all geo-matched businesses to the display unit.

2. The system according to claim 1, wherein said means for outputting business data includes means for tabularly displaying address depository information for each of said geo-matched businesses.

3. The system according to claim 2, wherein said means for outputting business data further includes:

means for requesting additional business data by selecting one of said geo-matched businesses; and means for rendering location depository information on the display unit.

4. The system according to claim 1, wherein said means for creating geo-business information further includes:

means for extracting a given set of key data elements from a given data set;

means for address standardizing extracted records by appending postal information; and means for geocoding each address standardized record by appending coordinate information.

5. The system according to claim 4, wherein said postal information includes ZIP+4 codes, city codes and country codes.

6. The system according to claim 4, further including means for sorting each address standardized record by said ZIP+4 codes.

7. The system according to claim 4, further including:

means for appending a public protection code to each address standardized record if a public protection code is available; and means for appending an unknown indicator to each address standardized record for which a public protection code is unavailable.

8. The system according to claim 1, further including:

means for determining occupancy type by analyzing Address Secondary High Number, Address Secondary Low Number, ZIP Address High Number and ZIP Address Low Number of said geo-business information; and means for appending occupancy type indicators to said geo-business information.

9. The system according to claim 8, further including:

means for creating records by extracting a given set of key data elements from occupancy type appended business information;

means for deleting any records that are missing one of said given set of key data elements;

means for appending a public protection code to each undeleted record if a public protection code is available; and means for geocoding each public protection coded undeleted record by appending coordinate information.

10. The system according to claim 1, wherein said means for creating geo-business information further includes:

means for extracting businesses having hazardous standard industry codes; and means for appending a hazard indicator to each business having a hazardous standard industry code.

11. The system according to claim 1, wherein said means for creating geo-business information further includes:

means for generating a first geo-carrier data set by processing carrier based policy information;

means for generating a second geo-carrier data set by processing a carrier based address data set;

means for generating a geo-commercial data set by processing a business data set; and means for geo-matching said first geo-carrier data set and said second geo-carrier data set with said geo-commercial data set.

12. The system according to claim 11, further including:

means for generating an occupancy type indicated data set; and means for geo-matching said occupancy type indicated data set with said geo-commercial data set.

13. The system according to claim 11, further including:

means for generating a single occupant structure data set;

means for generating a major firm sole tenant data set;

means for generating a major firm occupant multiple tenants data set;

means for generating a multiple tenant structure data set;

means for geo-matching said single occupant structure data set, said major firm sole tenant data set, said major firm occupant multiple tenants data set, and said multiple tenant structure data set with said geo-commercial data set.

14. A method for determining building occupancy for a site selected on a display unit, the method comprising the steps of:

creating geo-business information by geocoding business information;

geographically constructing a structure based on coordinates of the site and said geo-business information by geo-matching similarly geocoded businesses; and outputting business data on all geo-matched businesses to the display unit.

15. The method according to claim 14, wherein said step of outputting business data includes a step of tabularly displaying address depository information for each of said geo-matched businesses.

16. The method according to claim 15, wherein said step of outputting business data further includes the steps of:

requesting additional business data by selecting one of said geo-matched businesses; and rendering location depository information on the display unit.

17. The method according to claim 14, wherein said step of creating geo-business information further includes the steps of:

creating records by extracting a given set of key data elements from a given data set;

address standardizing said records by appending postal information; and geocoding each address standardized record by appending coordinate information.

18. The method according to claim 17, further including the steps of:

appending a public protection code to each address standardized record if a public protection code is available; and appending an unknown indicator to each address standardized record for which a public protection code is unavailable.

19. The method according to claim 14, further including the steps of:

determining occupancy type by analyzing Address Secondary High Number, Address Secondary Low Number, ZIP Address High Number and ZIP Address Low Number; and generating data sets for each occupancy type.

20. The method according to claim 19, further including the steps of:

creating records by extracting a given set of key data elements from a given occupancy data set;

deleting any records that are missing one of said given set of key data elements;

appending a public protection code to each undeleted record if a public protection code is available; and geocoding each public protection coded undeleted record by appending coordinate information.

21. The method according to claim 14, wherein said step of creating geo-business information further includes the steps of:

extracting businesses having hazardous standard industry codes; and appending a hazard indicator to each business having a hazardous standard industry code.

22. The method according to claim 14, wherein said step of creating geo-business information further includes the steps of:

generating a first geo-carrier data set by processing carrier based policy information;

generating a second geo-carrier data set by processing a carrier based address data set;

generating a geo-commercial data set by processing a business data set; and geo-matching said first geo-carrier data set and said second geo-carrier data set with said geo-commercial data set.

23. The method according to claim 22, further including the steps of:

generating at least one occupancy data set; and geo-matching said at least one occupancy data set with said geo-commercial data set.

24. The method according to claim 22, further including the steps of:

generating a single occupant structure data set;

generating a major firm sole tenant data set;

generating a major firm occupant multiple tenants data set;

generating a multiple tenant structure data set;

geo-matching said single occupant structure data set, said major firm sole tenant data set, said major firm occupant multiple tenants data set, and said multiple tenant structure data set with said geo-commercial data set.

25. An apparatus that determines building occupancy for a site selected on a display unit, the apparatus comprising:

a memory for geographically storing geo-business information;

a processor coupled to said memory, said processor operable to create said geo-business information by geocoding business information;

said processor further operable to geographically construct a structure based on coordinates of the site and said geo-business information by geo-matching similarly geocoded businesses; and said processor further operable to output business data on all geo-matched businesses to the display unit.

26. The apparatus according to claim 25, wherein said processor tabularly displays address depository information for each of said geo-matched businesses.

27. The apparatus according to claim 25, wherein said processor further includes:
    means for requesting additional business data by selecting one of said geo-matched businesses; and
    means for rendering location depository information on the display unit.

28. The apparatus according to claim 25, wherein said processor further includes:
    means for creating records by extracting a given set of key data elements from a given data set;
    means for address standardizing said records by appending postal information; and
    means for geocoding each address standardized record by appending coordinate information.

29. The apparatus according to claim 28, said processor further including:
    means for appending a public protection code to each address standardized record if a public protection code is available; and
    means for appending an unknown indicator to each address standardized record for which a public protection code is unavailable.

30. The apparatus according to claim 25, said processor further including:
    means for determining occupancy type by analyzing Address Secondary High Number, Address Secondary Low Number, ZIP Address High Number and ZIP Address Low Number; and
    means for generating data sets for each occupancy type.

31. The apparatus according to claim 30, said processor further including:
    means for creating records by extracting a given set of key data elements from a given occupancy data set;
    means for deleting any occupancy records that are missing one of said given set of key data elements;
    means for appending a public protection code to each undeleted record if a public protection code is available; and
    means for geocoding each public protection coded undeleted record by appending coordinate information.

32. The apparatus according to claim 25, wherein said processor further includes:
    means for extracting businesses having hazardous standard industry codes; and
    means for appending a hazard indicator to each business having a hazardous standard industry code.

33. The apparatus according to claim 25, wherein said processor further includes:
    means for generating a first geo-carrier data set by processing carrier based policy information;
    means for generating a second geo-carrier data set by processing a carrier based address data set;
    means for generating a geo-commercial data set by processing a business data set; and
    means for geo-matching said first geo-carrier data set and said second geo-carrier data set with said geo-commercial data set.

34. The apparatus according to claim 33, said processor further including:
    means for generating at least one occupancy data set; and
    means for geo-matching said at least one occupancy data set with said geo-commercial data set.

35. The apparatus according to claim 33, said processor further including:
    means for generating a single occupant structure data set;
    means for generating a major firm sole tenant data set;
    means for generating a major firm occupant multiple tenants data set;
    means for generating a multiple tenant structure data set;
    means for geo-matching said single occupant structure data set, said major firm sole tenant data set, said major firm occupant multiple tenants data set, and said multiple tenant structure data set with said geo-commercial data set.

* * * * *

UNITED STATES PATENT AND TRADEMARK OFFICE
CERTIFICATE OF CORRECTION

PATENT NO. : 5,978,769
DATED : November 2, 1999
INVENTOR(S) : Randall Brown, et al.

It is certified that error appears in the above-identified patent and that said Letters Patent is hereby corrected as shown below:

On the title page, item [73] Assignee should read:

-- Chubb & Son, a division of Federal Insurance Company --.

Signed and Sealed this

Fifteenth Day of May, 2001

*Attest:*

NICHOLAS P. GODICI

*Attesting Officer*  *Acting Director of the United States Patent and Trademark Office*